No. 768,429. PATENTED AUG. 23, 1904.
J. J. DEWEY.
APPARATUS FOR ERECTING BUILDINGS BY MOLDING ARTIFICIAL STONE.
APPLICATION FILED OCT. 1, 1903.
NO MODEL. 3 SHEETS—SHEET 1.
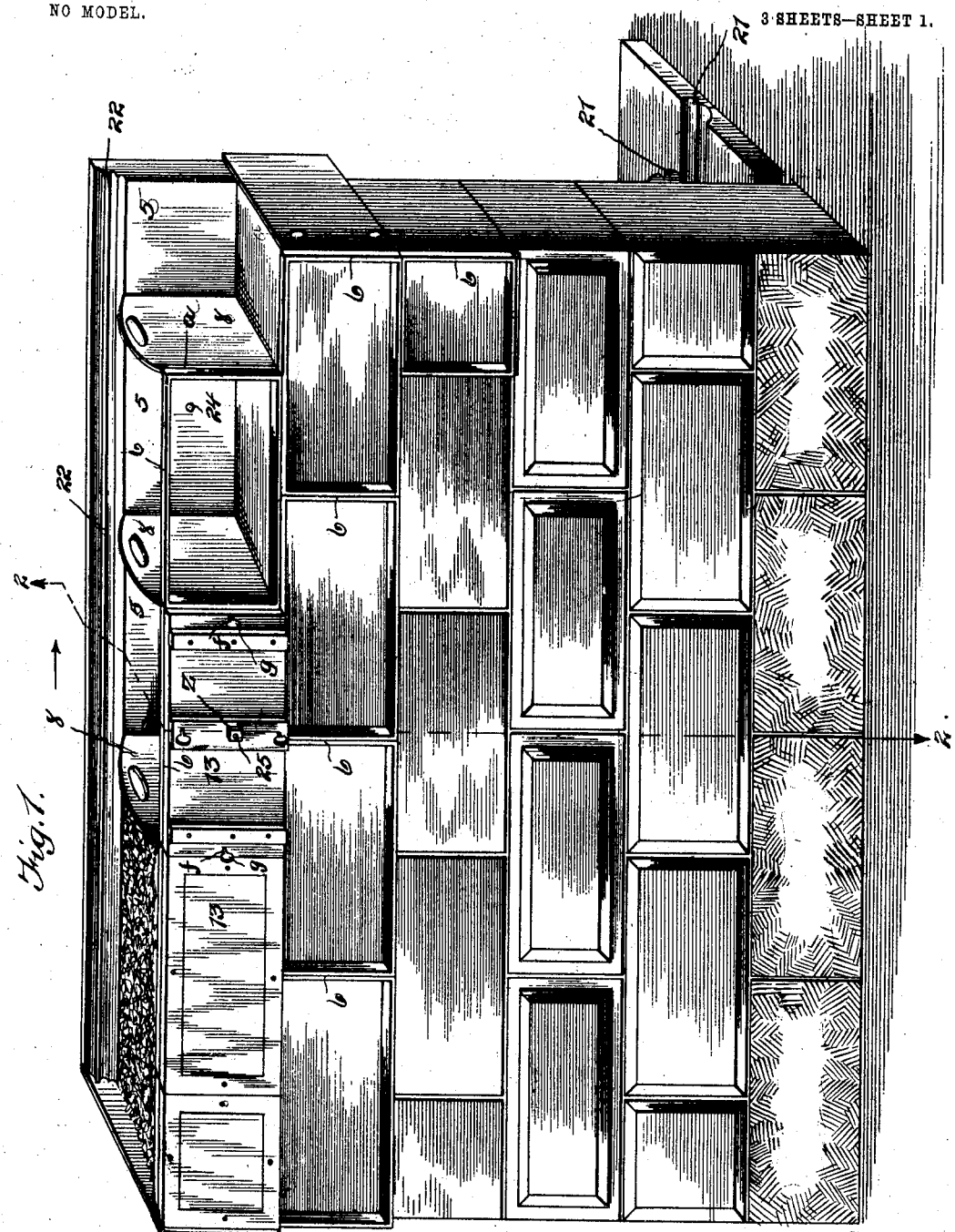
Witnesses
R. A. Boswell.
George M. Anderson.
Inventor
John J. Dewey,
By E. W. Anderson
his Attorney No. 768,429. PATENTED AUG. 23, 1904.
J. J. DEWEY.
APPARATUS FOR ERECTING BUILDINGS BY MOLDING ARTIFICIAL STONE.
APPLICATION FILED OCT. 1, 1903.
NO MODEL. 3 SHEETS—SHEET 2.
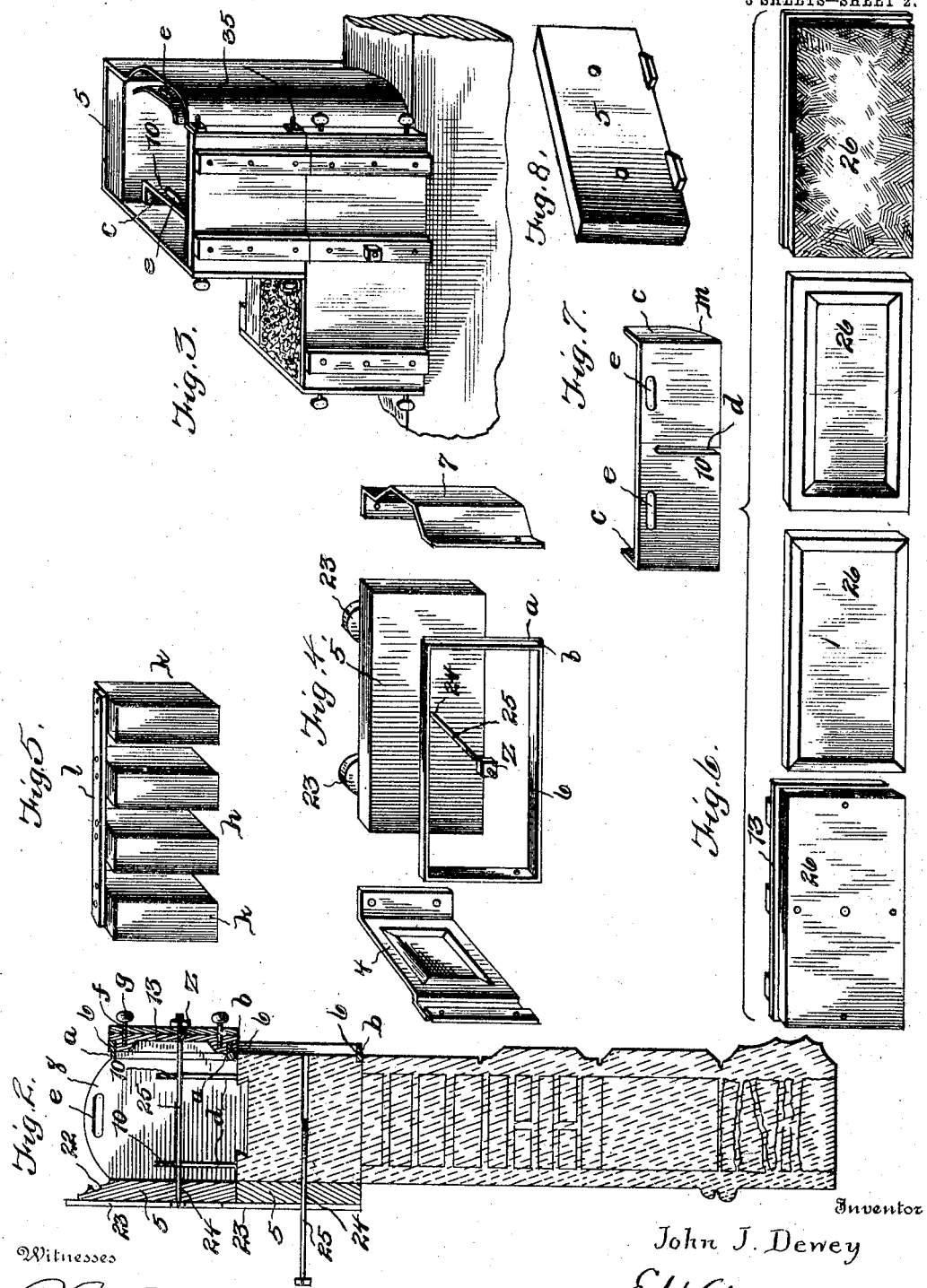
Witnesses
R. A. Boswell
George M. Anderson
Inventor
John J. Dewey
By E. W. Anderson
his Attorney No. 768,429. PATENTED AUG. 23, 1904.
J. J. DEWEY.
APPARATUS FOR ERECTING BUILDINGS BY MOLDING ARTIFICIAL STONE.
APPLICATION FILED OCT. 1, 1903.
NO MODEL. 3 SHEETS—SHEET 3.
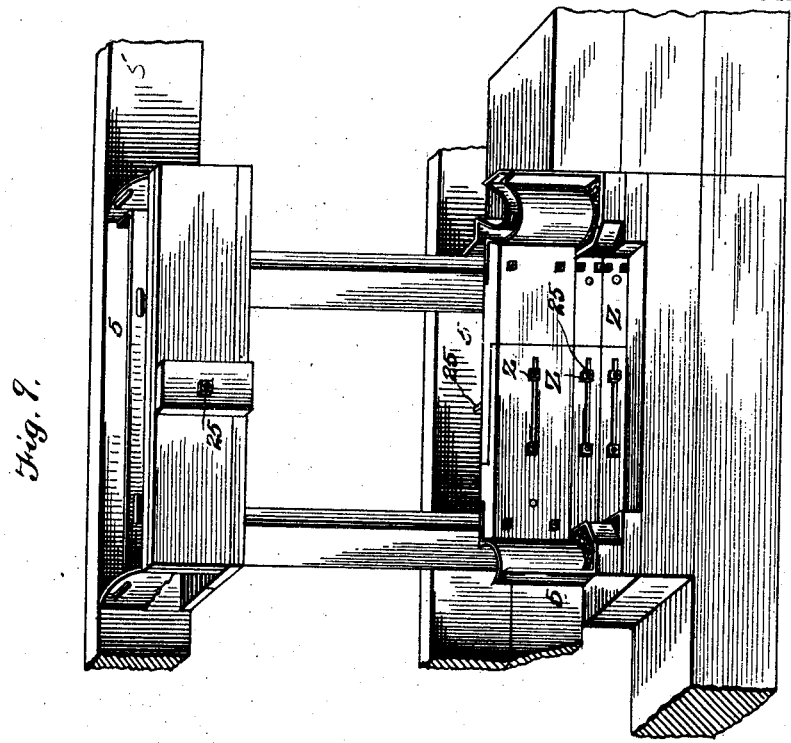
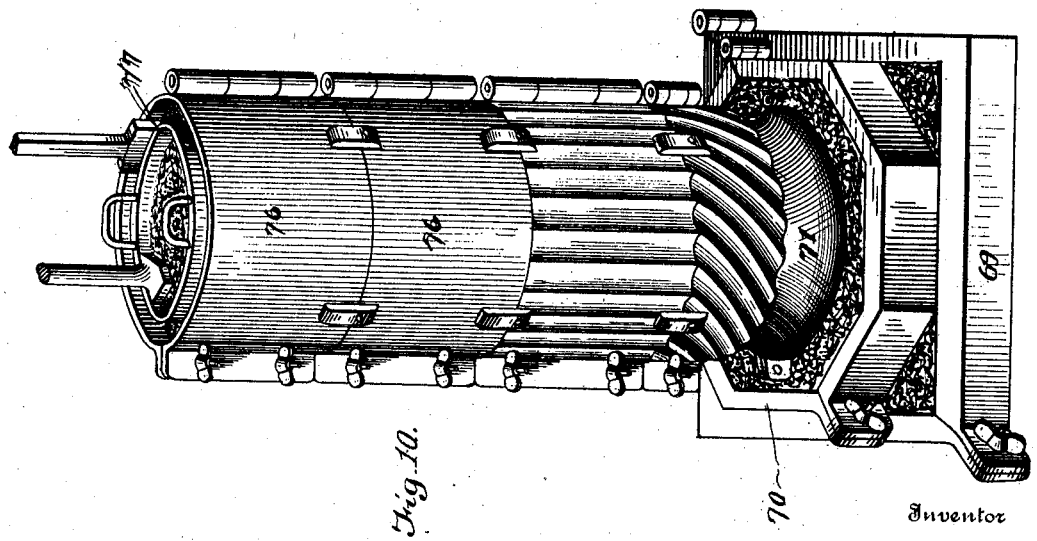
Witnesses
R. A. Boswell.
Georg. M. Anderson.
Inventor
John J. Dewey,
By E. W. Anderson
his Attorney No. 768,429. Patented August 23, 1904.

UNITED STATES PATENT OFFICE.

JOHN J. DEWEY, OF HIGHLAND PARK, TENNESSEE.

APPARATUS FOR ERECTING BUILDINGS BY MOLDING ARTIFICIAL STONE.

SPECIFICATION forming part of Letters Patent No. 768,429, dated August 23, 1904.

Application filed October 1, 1903. Serial No. 175,377. (No model.)

*To all whom it may concern:*

Be it known that I, JOHN J. DEWEY, a citizen of the United States, and a resident of Highland Park, in the county of Hamilton and State of Tennessee, have made a certain new and useful Invention in Apparatus for Erecting Buildings by Molding Artificial Stone; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1 is a perspective view illustrating the mold for the side wall as applied. Fig. 2 is a section on the line 2 2, Fig. 1. Fig. 3 is a perspective view of a modified form of the side-wall mold. Fig. 4 is a perspective view of the side-wall mold taken apart. Fig. 5 is a perspective view of the former $h$. Fig. 6 illustrates different forms of fronts for the side-wall mold. Fig. 7 is a detail view of the part 10. Fig. 8 is a detail view of the part 5. Fig. 9 is a perspective view of the mold for a doorway. Fig. 10 is a detail view of the mold for a column.

The invention is designed to facilitate building houses of artificial stone by molding the wall *in situ* or as it is being built; and the invention consists in the novel construction and combinations of devices, as hereinafter set forth.

The material to be used is such as is used ordinarily for artificial stone, and the wall may be either built up of the material in simple form, or it may be built of artificial-stone veneer or facing with a coarser filling of concrete, the entire wall being worked up from base to top or in such sections as may be found convenient in the construction.

In the accompanying drawings, illustrating the invention, 5 represents a back piece for molding the inner side of the wall. It may extend lengthwise sufficiently for molding a part of the wall corresponding to one stone or to several stones, and it may be grooved, as at 21, to form a base-molding near the floor or, as at 22, to form a molding near the ceiling. The back piece is provided with projections or lugs 23, extending upward from its outer surface to engage the next back piece above it. A perforation 24 is made about the middle of the back piece for the passage of the rear end of a bolt-rod 25, which also extends through a similar hole in the front piece 13 and is provided with a nut $z$. This bolt-rod serves to hold the front and back pieces together temporarily while this part of the wall is being molded. To the front piece, on the inside and around the marginal portion thereof, is attached an open metal frame 6 for holding the die-plate 26, which forms the face of the stone. The frame 6 is made with a rabbeted vertical edge and horizontal edge, as indicated at $a$, and with a corresponding projected vertical edge and horizontal edge, as indicated at $b$, whereby it is adapted to fit in line with and engage other frames of similar character above, below, or on either or both sides thereof. The length of this frame and of the front piece or cover may be sufficient to form the appearance of one stone or several stones, as may be advisable. The inner edge of the frame 6 is designed to project inward beyond the general plane of the die-plate 26 in order to provide a purchase in the wall for holding the part in position and to mold the depressions serving to represent the mortar seams outlining the representation of the stone. The die-plate may have thumb-screws $f$, which pass through perforations of the front piece and are secured by engagement with the part back of said front piece.

Between the back piece 5 and the frame 6 are placed the spreaders 8, which are made of different widths in accordance with the thicknesses of wall in common use, and when these spreaders are in position and the nut on the bolt-rod is screwed up the mold is ready for use, in so far as its general form is concerned, for molding artificial-stone composition solid or without interior modification.

Various die-plates having different designs may be employed in connection with the frames and front pieces, such die-plates being interchangeable with each other or with a plane-surface die-plate. These designs may be bevel-edged, paneled, or otherwise figured in relief or depression, as may be desired.

When it is desired to use finer material for the exterior surface or surfaces of the wall and coarser concrete for filling, the division-plates 10 are employed, these division-plates having offsets or flanges c to keep them the proper distance from the die-plate and back piece and being provided with vertical slots d, open at their lower ends to pass freely by the bolt-rod of the mold. The flanges c are beveled off at their lower ends, as at m, to allow the veneer composition to reach the ends of the mold. These division-plates and the spreaders are provided with handholds or catch-slots e, which serve to enable them to be drawn upward out of the material of the wall as such material is being pressed or tamped solid. When the division-plates are in position, the finer composition is placed between such plates and the surface die or back piece, while the coarser filling is placed between the front and back division-plates when both are used or between the front division-plate and the back piece when only the front division-plate is used. As the material is filled in it is pounded or tamped down by means of suitable stamping-tools, the division-plates and spreaders being raised from time to time during the operation until the structure is made solid to the top. Molds for forming the corner portion of the wall are of similar structure, having a die-plate 4 at one end instead of a temporary spreader. Such corner-die plate is designed to correspond in style with the plates used on the face of the wall, and it may be secured by means of thumb-screws to the back piece 5 and to the frame 6.

Sometimes it is desired to provide a hollow wall construction, which will require less material and will dry more rapidly. For this purpose the cavity-former h may be employed. This consists of a series of vertical blocks k, attached to a longitudinal connecting-bar l, which serves as a handle to place and withdraw the device. For windows and doors similar molds are provided, with such modifications as are proper for the design around the window-opening or door-opening. A bevel-end die-plate for such a mold is indicated at 7 and a round or swell die-plate at 35.

In the process of making a wall a sufficient number of back pieces, frames, spreaders, die-plates, bolt-rods, and division-plates, if the wall is to be veneered with fine stuff, are provided to lay the cement representing the first course. Then, if starting at a corner, an end plate of proper design is attached to the end of a mold which is placed in position on the foundation, which has been previously leveled off. If the stone is to be all of one kind of material, the mold is now ready to fill; but if the stone is to be finished with a facing or facings of finer stuff the division-plates are put in position. The first mold is then partly filled with the material to be used, the coarse filling in the middle portion and the fine veneer composition between the die-plate and the division-plate and, if the wall is to be faced inside, between the division-plate and the back piece. The division-plates are then raised a little and the materials pounded down by means of swages, so that the finer and coarser materials come together solidly under the division-plates, which are then raised again and the pounding continued, and so on until the mold is filled and the filling and facing compositions are pressed together, so that they will harden as one stone. When the front cover-piece is used for the face of the stone in conjunction with a die-frame to form a bevel edge or a panel-margin, the nut of the bolt-rod may be taken off and the bolt-rod partly removed. Then the cover-piece may be removed and the die-frame allowed to remain for a while until the face portion is polished, the hole made by the bolt-rod being plugged. This operation is repeated to form that portion of the wall next the part which has been formed, and so on until this layer of wall is completed. The spreaders are taken out as the wall course is laid, so that each portion is pressed solidly in contact with the next. The layer above this one is built in the same way, the lower layer being hardened sufficiently to allow the molds to be placed thereon, or the lower molds may remain *in situ* and the molds of the next layer placed thereon until two or more layers of the wall are built. When the upper layer is finished, the lower set of molds may be taken off and used to form the next layer above. In laying alternate courses the molds may vary in position at the corner the distance of a half-stone, if a half-lap is desired, the frames being adapted to slide along and fit anywhere on top of each other. Usually but two sets of mold apparatus—that is to say, a sufficient number of sets for forming a height of wall equal to two courses of stone—will be found sufficient to build a wall of any height. In the construction it is apparent that the back pieces are held in position in the hardening cement by means of the partly-withdrawn bolt-rods and that the metal front frames are held in position by being set into the channels which are to represent the mortar seams. Die-plates which have deep designs may be filled with the facing-cement before being set in place in the frame, and when the inside filling is pounded against it the whole becomes firmly knit together. In this case the front division-plate may be dispensed with. When a course of the artificial stone is laid and is designed to be allowed to harden before the next layer is put on, the lower course may be recessed with inward-inclined flanges or ribs to form a dovetail recess, so that the next layer will when pressed down be locked into it at its bottom. When both outside and inside surfaces of the wall are to be finished plain, the front piece of the mold may be made like the back piece.

The sills, sides, and tops of openings for windows and doors can be built up of the artificial-stone composition around the window and door frames by using properly-designed die-plates and molds adapted to fit each other, as hereinbefore indicated for the walls. Such devices are indicated in Fig. 9 of the drawings.

In making columns I employ a hinged frame 69 for molding the base. 70 indicates an octagon plinth-frame next the base, and 71 a bead-frame. 76 shows other forms for continuing the molding process to the upper end of the column. These are each designed to be hinged on one side and connected at the opposite side by means of lugs and a key. The removable cylinder 77 is employed for the veneering. This veneering device may also have a fluted contour. It is designed to be provided with handles for adjusting and lifting.

In building the main wall each back piece may also be provided with interior flanges for penetrating the wall as it is being built to aid in supporting the back piece above it.

When a die is used which is stamped to mold an imitation of chipped stone or rubble-face, such die may be used without a cover, as the surface does not require finishing off. In this case the cover and die may be said to be in one piece.

Having described this invention, what I claim, and desire to secure by Letters Patent, is—

1. In a building-mold for laying artificial stone, the combination with the back piece, and front cover, of the vertically-slidable spreader-plate, and the bolt-rod and nut, substantially as specified.

2. A set of building-molds for laying artificial stone, having removable front and back portions provided with means of edge engagement, removable vertically-slidable spreader-plates, and removable bolts and nuts, substantially as specified.

3. In a building-mold for laying artificial stone, the combination with the back piece, the front cover, and the die-frame of the spreader, and the bolt-rod and nut, substantially as specified.

4. In a building-mold for laying artificial stone, the combination with the back piece, the front cover, the die-frame and die-plate of the spreader and the bolt-rod and nut, substantially as specified.

5. In a building-mold for laying artificial stone, the combination with the back piece, and front cover, and a die-plate of the vertically-slidable spreader, the division-plate and the bolt-rod and nut, substantially as specified.

6. In building-molds, the combination with the open frame, of a removable die-plate fitting in said frame, substantially as specified.

7. The combination with a building-mold for artificial stone, of a vertically-slidable division-plate having end flanges beveled off at the bottom to allow the veneer composition to reach the ends of the mold, substantially as specified.

In testimony whereof I affix my signature in presence of two witnesses.

JOHN J. DEWEY.

Witnesses:
J. G. BURTON,
V. DEWEY.